No. 792,772. PATENTED JUNE 20, 1905.
L. P. HALLADAY.
WHEEL FOR CARPET SWEEPERS.
APPLICATION FILED OCT. 17, 1904.

Witnesses.
Edward T. Wray.
Homer L. Kraft.

Inventor.
Lewis P. Halladay.
by Parker Carter
Attorney's.

No. 792,772. Patented June 20, 1905.

UNITED STATES PATENT OFFICE.

LEWIS P. HALLADAY, OF STREATOR, ILLINOIS, ASSIGNOR TO STREATOR METAL STAMPING COMPANY, OF STREATOR, ILLINOIS, A CORPORATION OF ILLINOIS.

WHEEL FOR CARPET-SWEEPERS.

SPECIFICATION forming part of Letters Patent No. 792,772, dated June 20, 1905.

Application filed October 17, 1904. Serial No. 228,710.

*To all whom it may concern:*

Be it known that I, LEWIS P. HALLADAY, a citizen of the United States, residing at Streator, in the county of Lasalle and State of Illinois, have invented a certain new and useful Improvement in Wheels for Carpet-Sweepers, of which the following is a specification.

My invention relates to wheels, particularly such as are intended for carpet-sweepers, as illustrated in the accompanying drawings, wherein—

Figure 1:
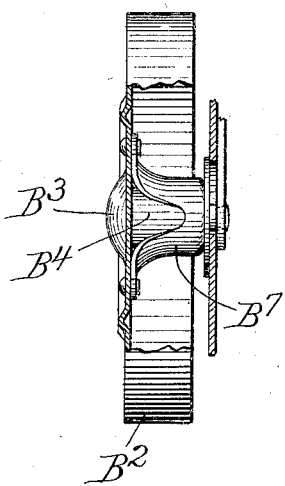
Figure 3:
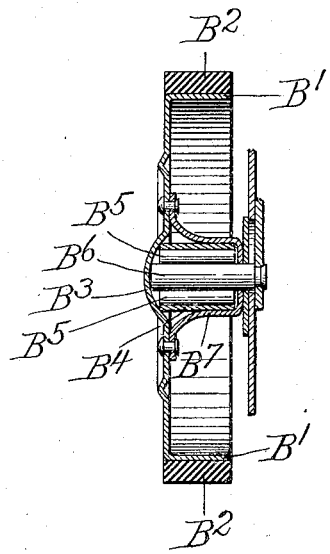
Figure 2:
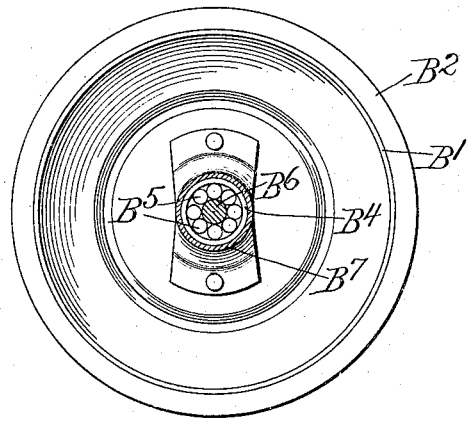

Figure 1 is an edge elevation of the wheels with the parts broken away. Fig. 2 is a side elevation with parts in section, and Fig. 3 is a section through the wheel.

Like letters refer to like parts throughout the several figures.

The main wheels of the sweeper are preferably stamped out of sheet metal. In Figs. 2 and 3 I have shown the construction of these wheels. Each wheel consists of a sheet of metal turned over at the edges at $B'$, so as to form the rim or periphery upon which the tire $B^2$ is supported. At the center the metal is forced outwardly, as shown at $B^3$. A sleeve $B^4$ is located at the middle portion of the wheel and contains a series of rollers $B^5$, the axle $B^6$, extending into this sleeve, being surrounded by the rollers, so as to form a roller-bearing. A cap $B^7$ is attached to the wheel in any desired manner and engages the sleeve $B^4$, so as to hold it in position, said cap being provided with an opening through which the axle $B^6$ projects. This axle $B^6$ is attached to the sweeper-casing in any desired manner. The cap $B^7$ is stamped out of metal, and it will be seen that this wheel may thus be easily and cheaply produced. The wheels so constructed may be used in any desired mechanism. I have contemplated their use in connection with carpet-sweepers, the wheel being placed on one end of the carpet-sweeper axle and being held in position by the band. These parts are not shown, but are only suggested to illustrate the use and operation. The parts may all be struck up out of sheet metal and may be secured together in any desired manner. The shapes of the several parts may also be varied.

I have described in detail a particular construction embodying my invention; but it is of course evident that the parts may be greatly varied in form, construction, and arrangement without departing from the spirit of my invention, and I therefore do not limit myself to the particular construction shown.

I claim—

1. A wheel for carpet-sweepers comprising a piece of material with its edge bent over so as to form the rim, a cap attached to said piece of material near its middle, a sleeve inclosed by said cap, a shaft extending through said cap and into said sleeve, and a series of rollers interposed between the sleeve and the shaft.

2. A wheel comprising a piece of sheet metal bent over at the edge to form the rim of the wheel, the metal depressed at the middle so as to form a hollow part, a sleeve having its end projecting into said hollow part, a cap surrounding said sleeve and engaging the same so as to hold it in position, said cap fastened to the wheel, and a shaft extending through said cap into said sleeve.

LEWIS P. HALLADAY.

Witnesses:
C. DAUBLE,
E. R. WILLIAMS.